(12) United States Patent
Luo

(10) Patent No.: US 12,376,580 B1
(45) Date of Patent: Aug. 5, 2025

(54) MOUSE TRAP

(71) Applicant: Shenzhen Visson Technology Co., Ltd., Guangdong (CN)

(72) Inventor: Chengyang Luo, Guangdong (CN)

(*) Notice: Subject to any disclaimer, the term of this patent is extended or adjusted under 35 U.S.C. 154(b) by 0 days.

(21) Appl. No.: 18/808,253

(22) Filed: Aug. 19, 2024

(51) Int. Cl.
*A01M 23/38* (2006.01)

(52) U.S. Cl.
CPC .................................. *A01M 23/38* (2013.01)

(58) Field of Classification Search
CPC ..................................................... A01M 23/38
USPC ......................................................... 43/98, 99
See application file for complete search history.

(56) References Cited

U.S. PATENT DOCUMENTS

| | | | | |
|---|---|---|---|---|
| 2,360,651 | A * | 10/1944 | Crumrine | A01M 23/38 250/221 |
| 2,411,766 | A * | 11/1946 | Vincent | A01M 23/38 43/99 |
| 2,441,499 | A * | 5/1948 | Medlin | A22B 3/06 128/897 |
| 2,515,947 | A * | 7/1950 | Crumrine | A01M 23/18 43/99 |
| 2,677,209 | A * | 5/1954 | Hutchison, Sr. | A01M 23/38 43/99 |
| 3,815,278 | A * | 6/1974 | Beaton | A01M 23/38 43/99 |
| 4,669,216 | A * | 6/1987 | Moss | A01M 27/00 43/99 |
| 5,027,547 | A * | 7/1991 | Livshin | A01M 23/24 43/124 |
| 5,107,619 | A * | 4/1992 | Zapata | A01M 23/30 43/75 |
| 12,089,583 | B2 * | 9/2024 | Krehel | A01M 23/30 |
| 2018/0139949 | A1 * | 5/2018 | Liu | A01M 99/00 |
| 2018/0271085 | A1 * | 9/2018 | Sørensen | A01M 23/38 |
| 2018/0352801 | A1 * | 12/2018 | Veber | A01M 23/08 |
| 2020/0187486 | A1 * | 6/2020 | Chen | A01M 23/38 |
| 2021/0392871 | A1 * | 12/2021 | Kaye | A01M 31/002 |
| 2023/0061104 | A1 * | 3/2023 | Liu | A01M 23/38 |
| 2023/0064810 | A1 * | 3/2023 | Feng | A01M 23/38 |
| 2023/0066354 | A1 * | 3/2023 | Kisling-Møller | A01M 23/245 |
| 2023/0066844 | A1 * | 3/2023 | Chen | A01M 23/38 |
| 2023/0329222 | A1 * | 10/2023 | Yang | A01M 23/16 |
| 2024/0415108 | A1 * | 12/2024 | Krehel | A01M 23/14 |

FOREIGN PATENT DOCUMENTS

| | | | | |
|---|---|---|---|---|
| CN | 105850967 | A * | 8/2016 | ............ A01M 23/16 |
| CN | 106804577 | A * | 6/2017 | |
| CN | 212660934 | U * | 3/2021 | |
| DE | 102014016514 | A1 * | 5/2016 | ............ A01M 23/08 |
| GB | 2454967 | A * | 5/2009 | ............ A01M 23/12 |
| GB | 2516465 | A * | 1/2015 | ............ A01M 23/12 |

(Continued)

*Primary Examiner* — Darren W Ark
(74) *Attorney, Agent, or Firm* — Hawaii Patent Services; Nathaniel K. Fedde; Kenton N. Fedde

(57) ABSTRACT

A mouse trap comprises a shell, which comprises a base and an upper shell mounted above the base, wherein an electric shock device, a mouse pressing device and a locking device are arranged in the shell; the electric shock device comprises a conductive element, the mouse pressing device is movably mounted on the top wall of the shell and extends downwards towards the base, and the bottom end of the mouse pressing device is positioned above the conductive element of the electric shock device.

15 Claims, 18 Drawing Sheets

(56) References Cited

FOREIGN PATENT DOCUMENTS

| SU | 1158139 A1 | * | 5/1985 | | |
|----|------------|---|--------|---|---|
| WO | WO-9918780 A1 | * | 4/1999 | ............ | A01M 1/026 |
| WO | WO-03059057 A1 | * | 7/2003 | ............ | A01M 23/04 |
| WO | WO-2011098087 A1 | * | 8/2011 | ............ | A01M 23/38 |
| WO | WO-2012139585 A1 | * | 10/2012 | ............ | A01M 19/00 |
| WO | WO-2017078547 A2 | * | 5/2017 | ............ | A01M 23/24 |

* cited by examiner

A

C

MOUSE TRAP

TECHNICAL FIELD

The present invention relates to the technical field of mouse trapping, in particular to a mouse trap.

BACKGROUND

The electric mouse cage is a kind of equipment that is often used to catch mice. The electric mouse cage is usually made of metal or plastic and is widely used in rural areas and cities. The working principle of the electric mouse cage is to use food to induce rats to enter the cage and trigger the electric shock mechanism, and then the electric shock mechanism uses high-voltage micro-current to make them unable to escape.

When the existing mouse trap is used, when the mouse steps on two conducting strips and triggers the electric shock function, the mouse will struggle due to its instinctive reaction, and during the struggle of the mouse, the mouse will turn over or lift up, thus causing the mouse to break away from the conducting strips and stop the electric shock function, and when the electric shock stops, the mouse will escape.

Therefore, it is necessary to put forward a new type of mouse trap, which can prevent the mouse from turning over or lifting up after being shocked, avoid the mouse from being out of contact with the conducting strip, and improve the success rate of mouse trapping.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a mouse trap to solve the problem that when the mouse is shocked, the mouse will struggle and get out of contact with the conducting strip.

In order to achieve the above purpose, the present invention adopts the following technical solution:

A mouse trap includes a shell, wherein the shell includes a base and an upper shell installed above the base; an electric shock device, a mouse pressing device and a locking device are arranged in the shell;
the electric shock device comprises a conductive element; and
the mouse pressing device is movably installed on a top wall of the shell and extends downwards towards the base, and a bottom end of the mouse pressing device is located above the conductive element of the electric shock device; and
the locking device comprises a locking element movably installed in the shell, and a driving mechanism for driving the locking element to move, wherein the locking element is capable of moving between a locked position and an unlocked position, and is clamped with the mouse pressing device when the locking element is located in the locked position, so as to limit the movement of the mouse pressing device; and
when the locking element is in the unlocked position, the locking element is released from the mouse pressing device, so as to release the mouse pressing device to enable the mouse pressing device to move.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
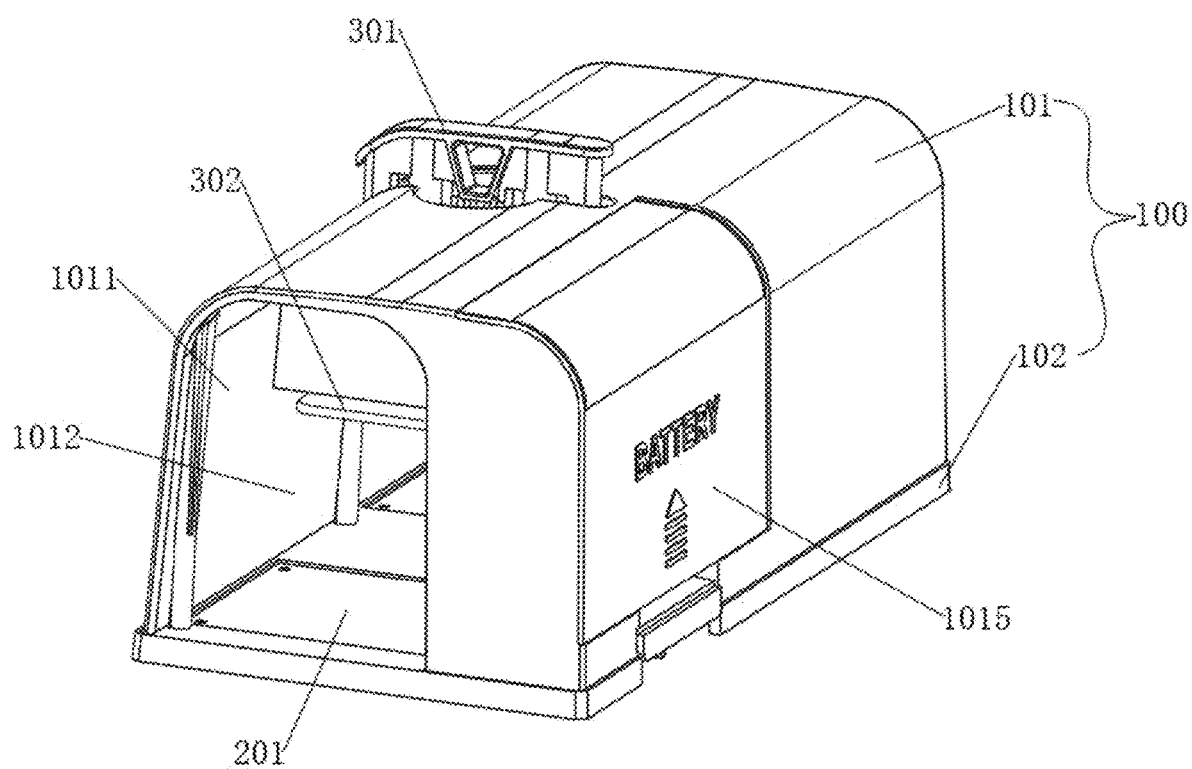
FIG. 1 is a schematic view from the front view of the luring state of a mouse trap according to an embodiment of the present invention.

In the figures: 100—Shell, 101—Upper shell, 1011—Trap opening, 1012—Trap area, 1013—Installation cavity, 1014—Battery compartment, 1015—Cover plate, 1016—Side plate, 1017—Bait slot, 102—Base, 200—Electric shock device, 201—Conducting strip, 202—Storage battery, 203—High-voltage pack, 204—Control circuit board, 2041—Operation switch. 300—Mouse pressing device. 301—Mouse pressing frame, 3011—Clamping groove, 3012—Guide post, 3013—Slide seat, 3014—Compression spring, 302—Pressing plate, 3021—Fixed plate, 3022—Movable plate, 3023—Chute, 3024—Slide bar, 3025—Anti-skid rib, 3026—Through groove, 400—Locking device, 401—Locking element, 4011—Arc-shaped groove, 402—Driving mechanism, 4021—Motor frame, 4022—Driving motor, 4023—Turntable, 4024—Cylinder, 4025—Torsion spring.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention provides a mouse trap, which includes a shell 100, wherein the shell 100 includes a base 102 and an upper shell 101 installed above the base 102, and an electric shock device 200, a mouse pressing device 300 and a locking device 400 are arranged in the shell 100.

Figure 10:
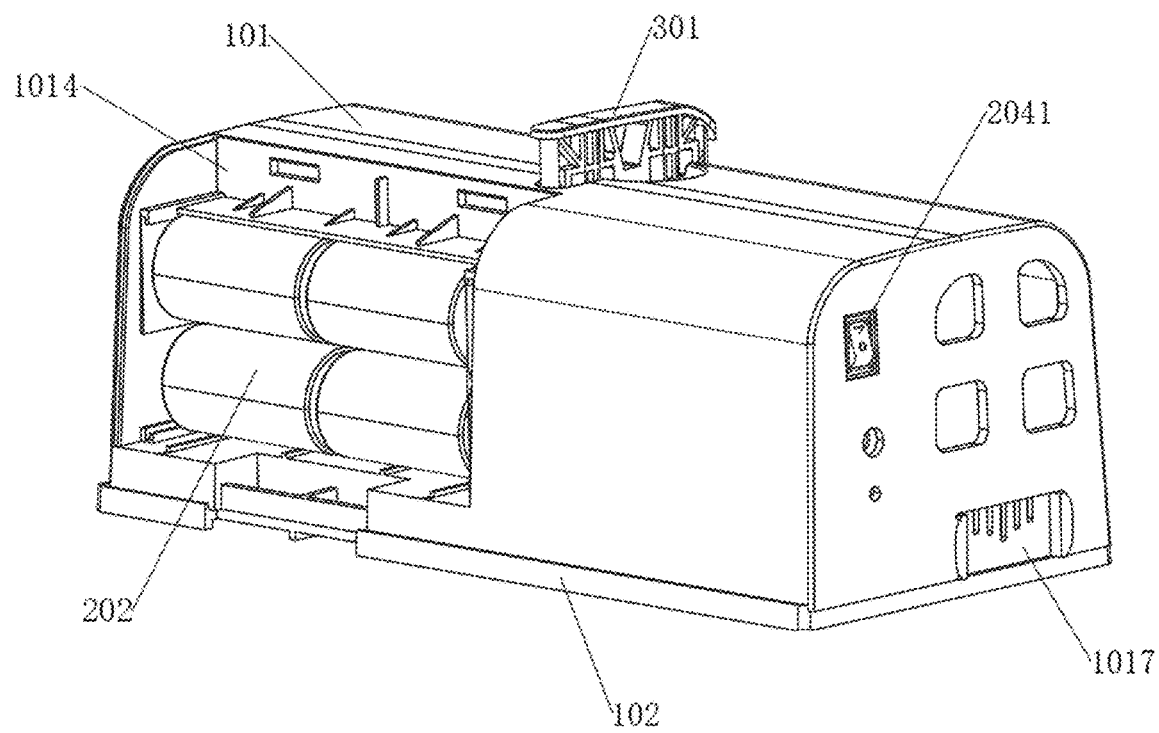
FIG. 10 is a state diagram of the mouse trap according to an embodiment of the present invention when the battery compartment cover plate is removed.
Figure 17:
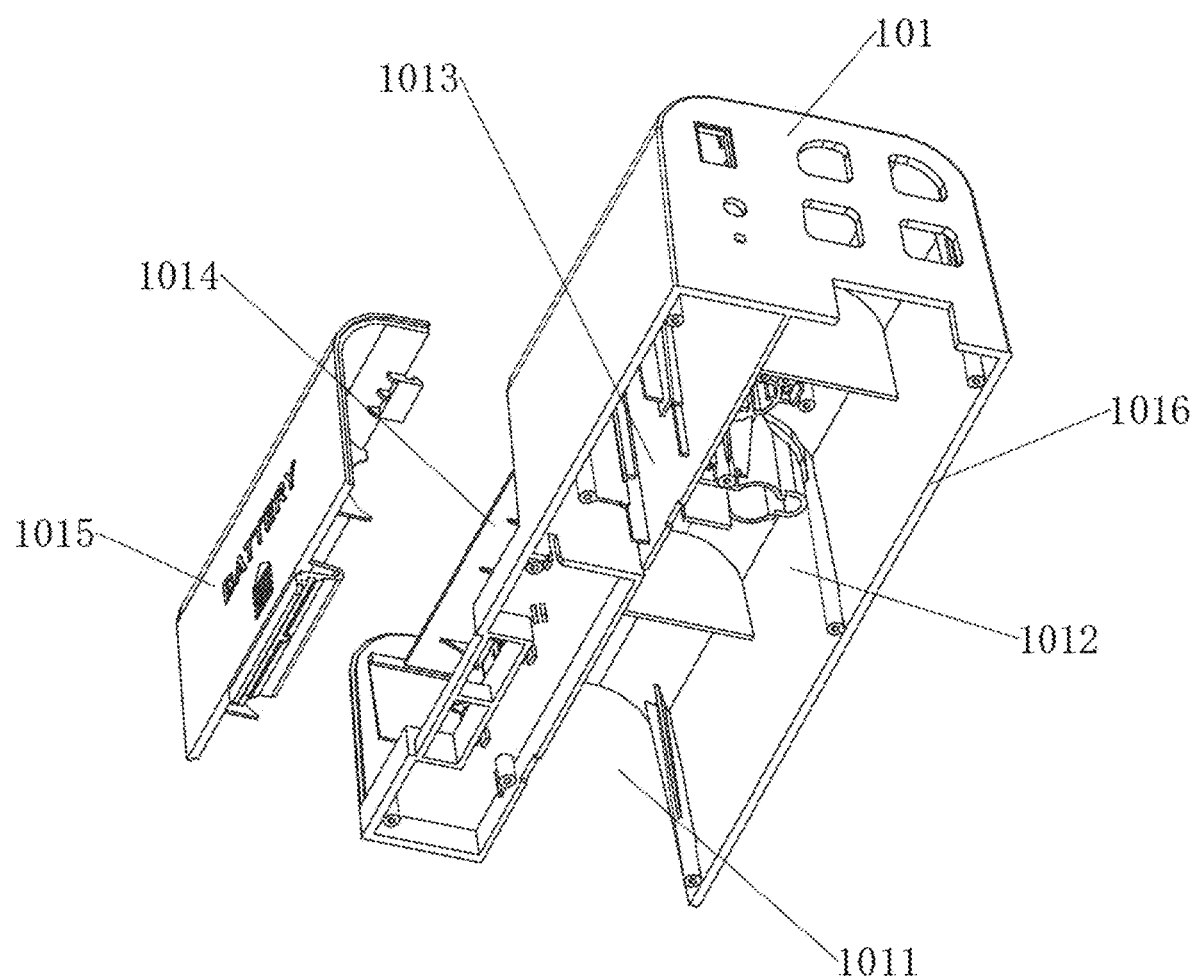
FIG. 17 is a schematic diagram of the upper shell structure according to an embodiment of the present invention.

As shown in FIGS. 1, 10 and 17, the upper shell 101 includes a top wall and side walls extending from the top wall. An accommodating cavity is defined in the upper shell 101, and the bottom of the upper shell 101 is open. The side wall of the upper shell 101 includes a front end face and a rear end face which are opposite, and two side faces which are respectively connected between the front end face and the rear end face on both sides. The front end surface of the upper shell 101 is provided with a trap opening 1011, and a bait slot 1017 is provided in the upper shell 101 for placing bait.

The bait slot 1017 may be disposed adjacent to the rear end face of the upper shell 101, that is, the end opposite to the trap opening 1011. Preferably, the rear end face of the upper shell 101 is provided with a through hole, through which the smell of bait can be emitted to the outside of the trap, thereby attracting mice, and the attracted mice can enter the trap through the trap opening 1011. In this embodiment, the bait slot 1017 is an independent container, which is detachably installed in the shell 100. The bait slot 1017 is correspondingly installed at the through hole and can be embedded in the wall of the upper shell 101.

Figure 4:
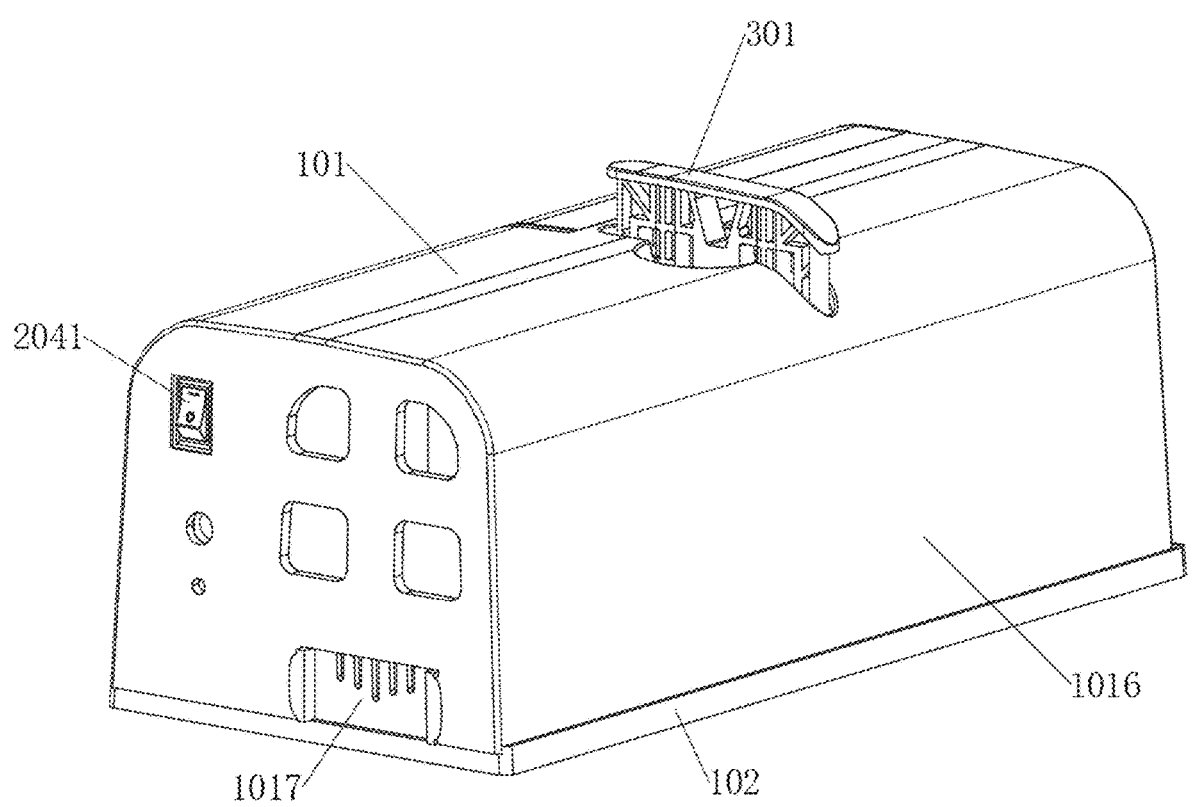
FIG. 4 is a schematic view of the rear view of the mouse trap in the luring state according to an embodiment of the present invention.
Figure 5:
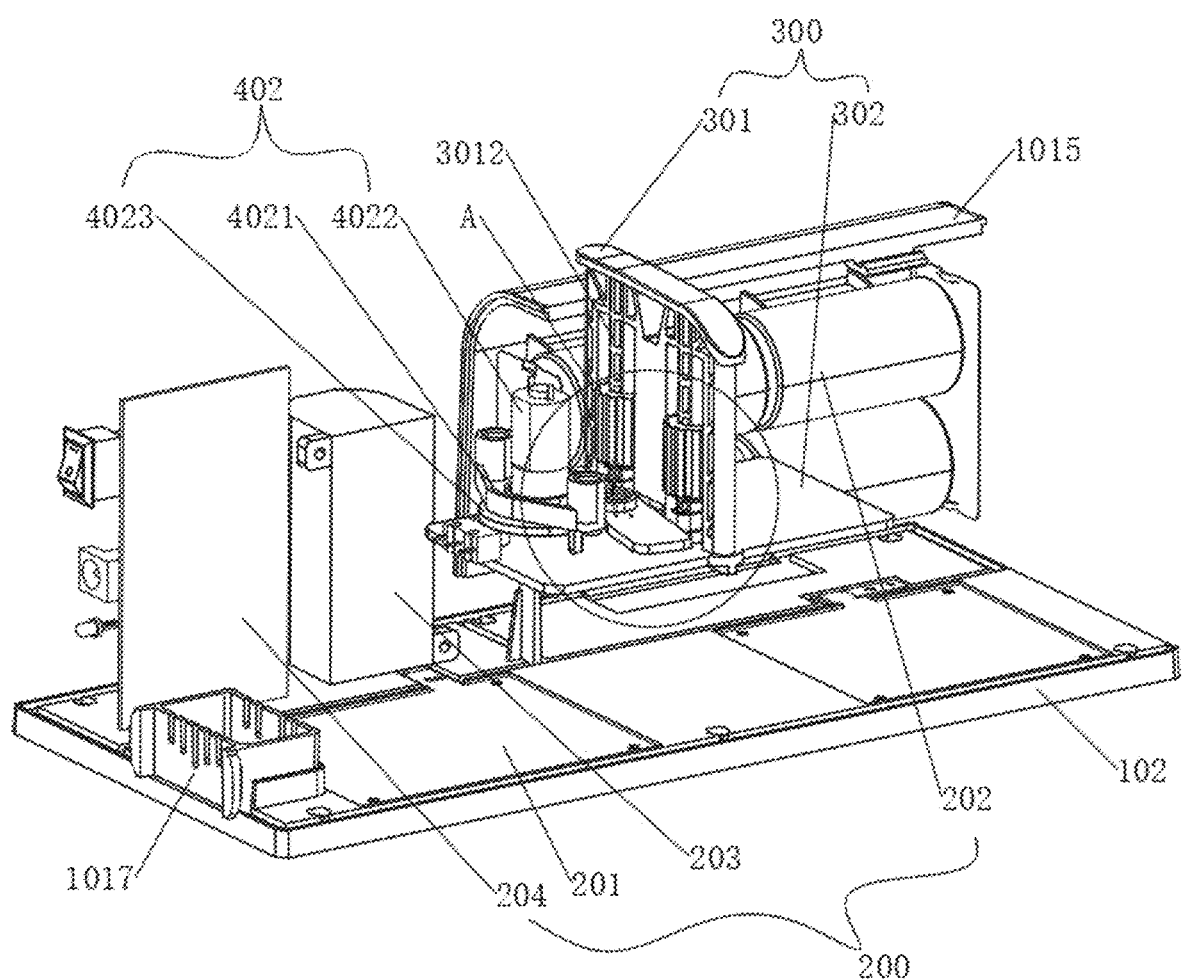
FIG. 5 is a schematic structural view of the rear view of the mouse trap in the luring state according to an embodiment of the present invention.
Figure 11:
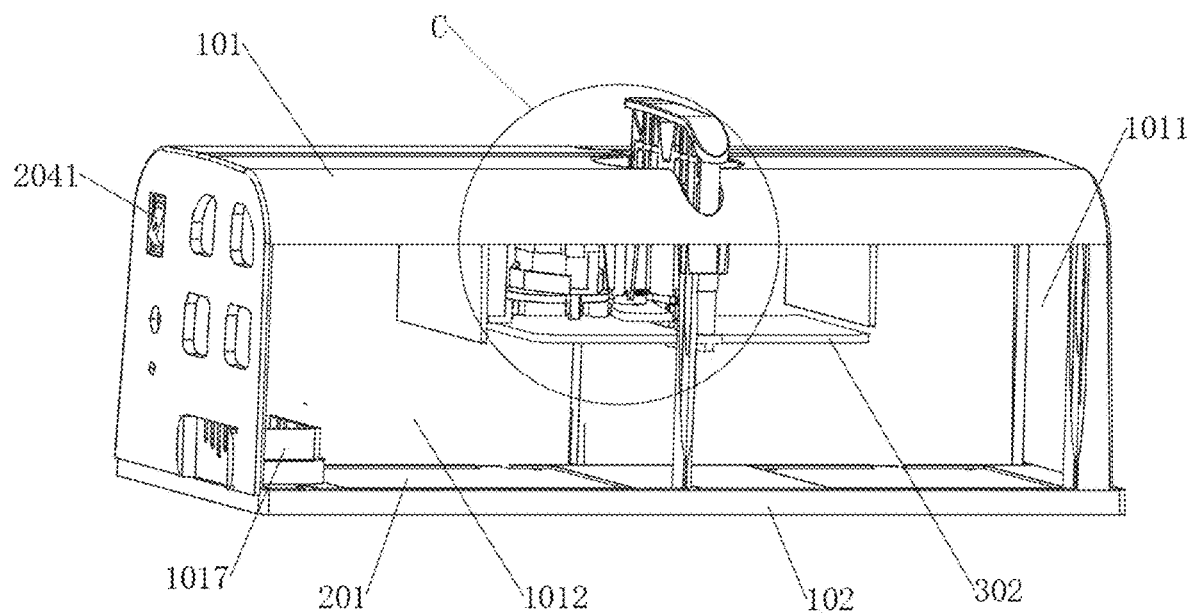
FIG. 11 is a state diagram of the mouse trap according to an embodiment of the present invention when the left side panel of the upper shell is removed.
Figure 12:
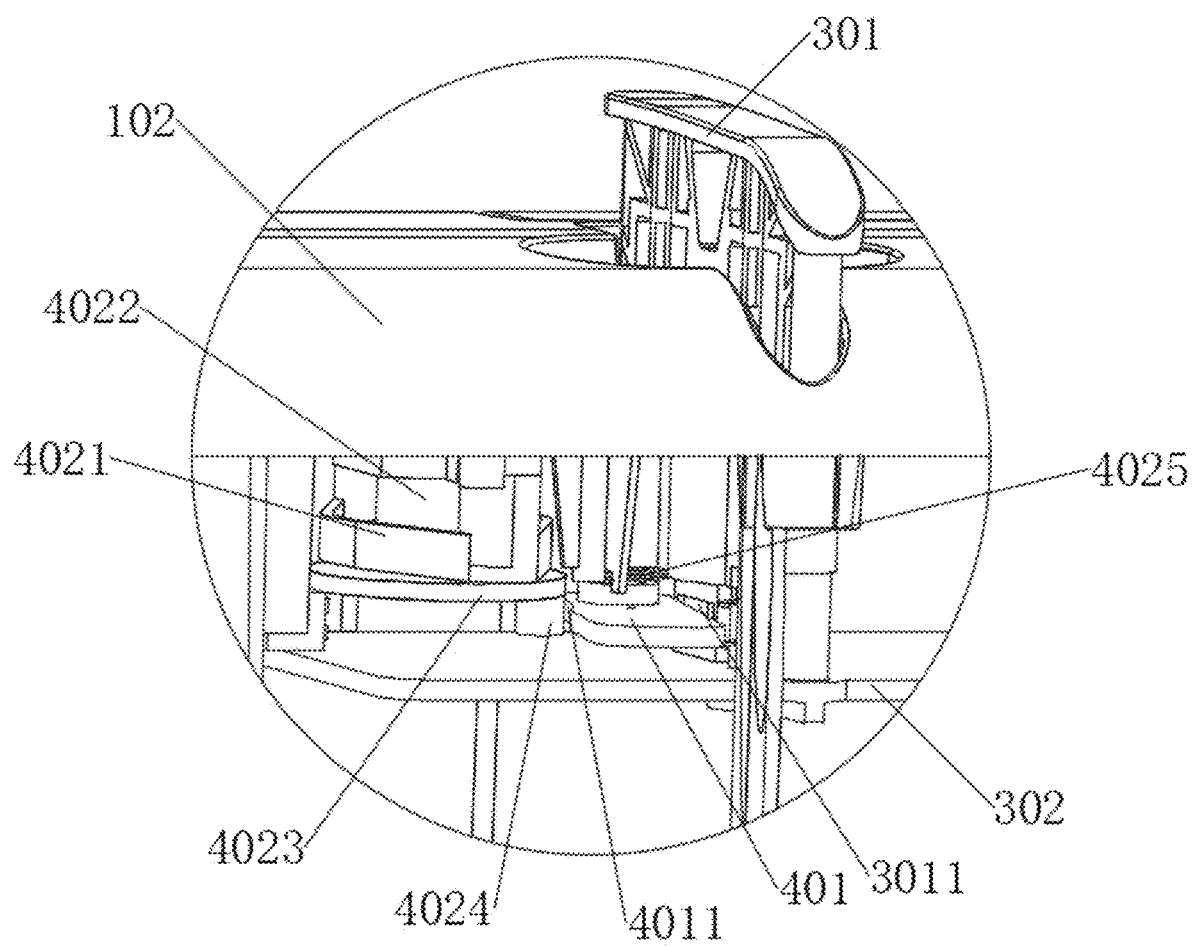
FIG. 12 is a partially enlarged schematic view at C in FIG. 11.
Figure 13:
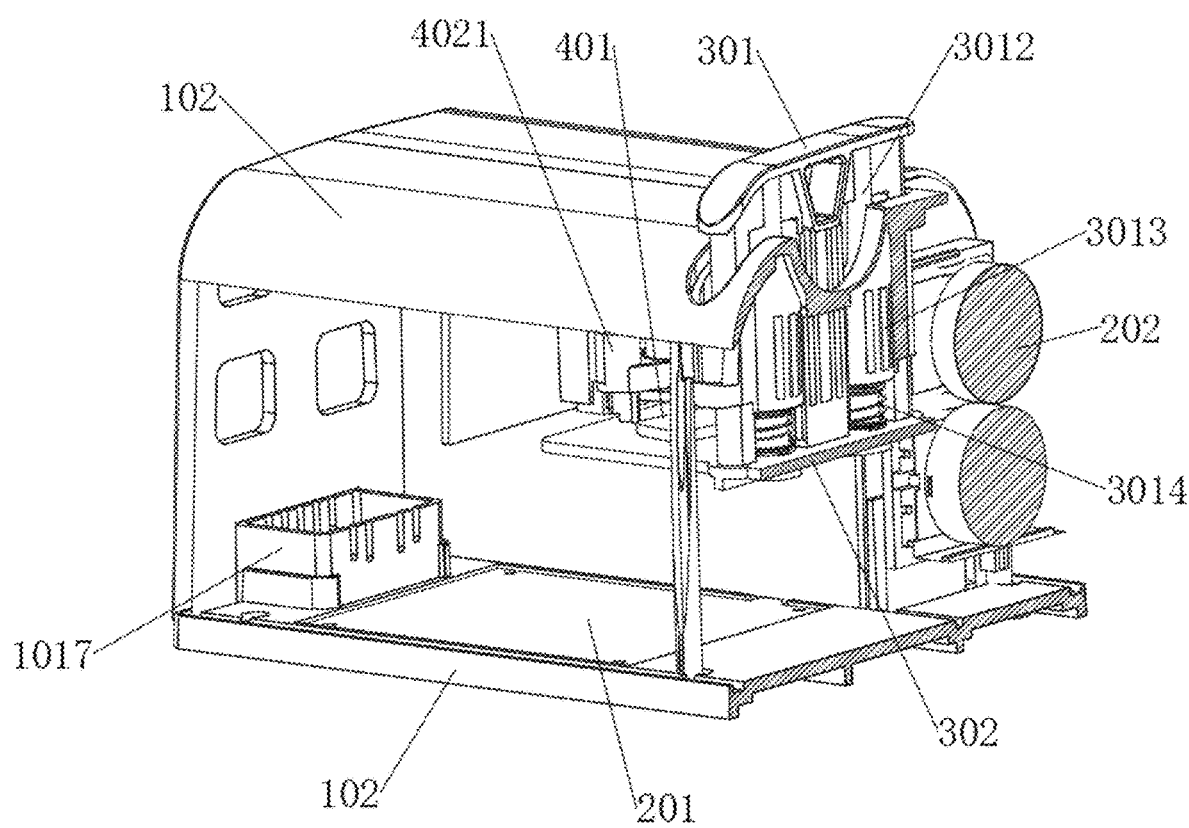
FIG. 13 is a cross-sectional view of the middle of FIG. 11.

In some embodiments, as shown in FIGS. 4 and 5, the top of the bait slot 1017 is open, which is convenient for taking and placing the bait. The wall of the bait slot 1017 is provided with a plurality of perforations, which is beneficial to the odor emission of the bait. Preferably, the perforations are long-strip shaped, and a plurality of long long-strip shaped perforations are arranged in parallel. The left and right sides of the upper shell 101 are provided with detachable side plates 1016, so that when the trap needs to be repaired or maintained, the side plates 1016 can be opened to expose the accommodating cavity for repair or maintenance, as shown in FIGS. 11, 12 and 13.

The electric shock device 200 includes a conductive element, a storage battery 202, a high-voltage pack 203 and a control circuit board 204. A battery compartment 1014 is opened in the upper shell 101, and the storage battery 202 is installed in the battery compartment 1014. There is also an installation cavity 1013 in the upper shell 101, which is separated from the battery compartment 1014, and both the high-voltage pack 203 and the control circuit board 204 are installed in the installation cavity 1013. The upper shell 101 also includes a trap area 1012, and the installation cavity 1013 and/or the battery compartment 1014 are isolated from the trap area 1012. The upper shell 101 is provided with a detachable cover plate 1015 corresponding to the battery compartment 1014. In this embodiment, the trap area 1012 communicates with the trap opening 1011, and the trap area is an area for trapping mice. The conductive element includes at least two conducting strips 201, which are installed on the upper surface of the base 102 and located in the trap area 1012. Understandably, the conducting strip 201 can also be fixed in the upper shell 101. The control circuit board 204 preferably has a single chip microcomputer.

Figure 8:
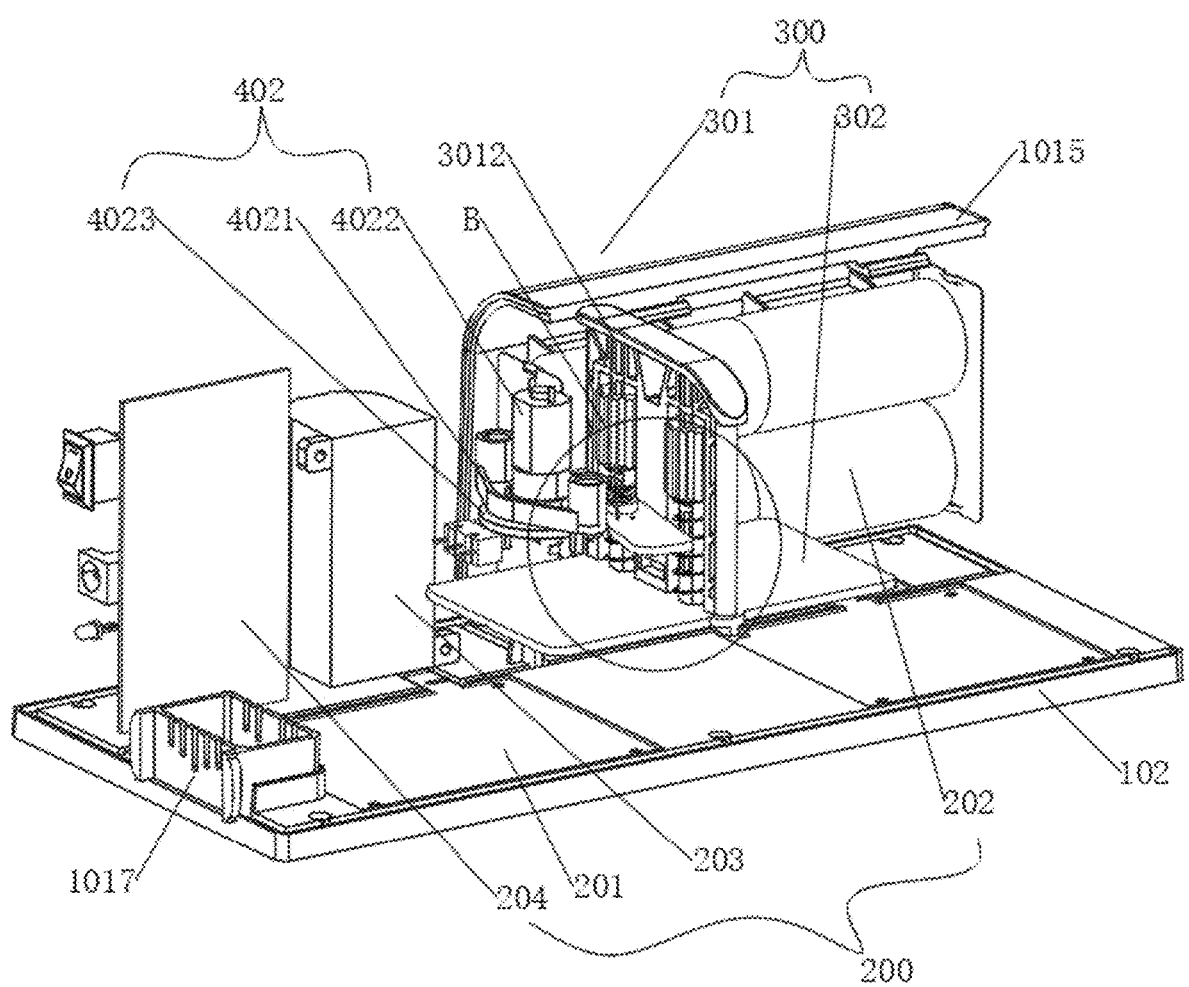
FIG. 8 is a schematic structural view of the rear view of the killing state of the mouse trap according to an embodiment of the present invention.
Figure 9:
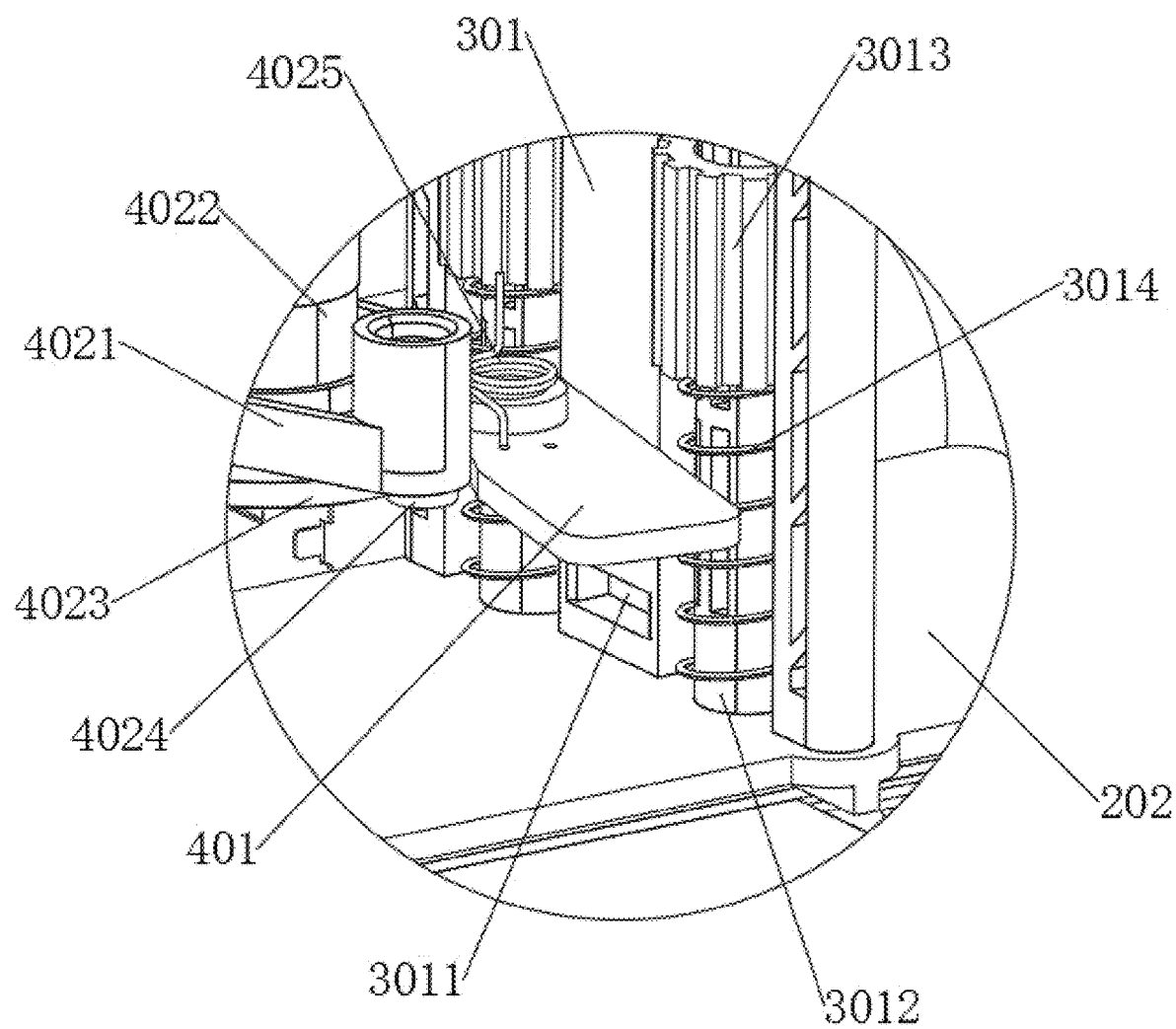
FIG. 9 is a partially enlarged schematic view at B in FIG. 8.
Figure 18:
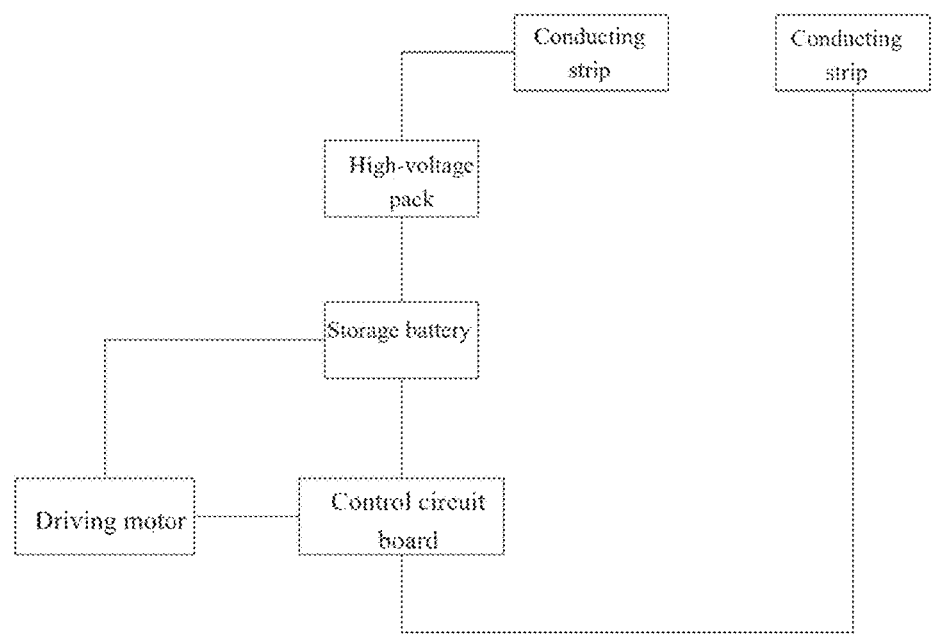
FIG. 18 is a schematic diagram of module connection of a mouse trap according to an embodiment of the present invention.

As shown in FIG. 5, FIG. 8, and FIG. 18, in one embodiment, two conducting strips 201 are a positive electrode and a negative electrode which are isolated from each other, and there is a gap between the two conducting strips 201. One conducting strip 201 is electrically connected to one end of a high-voltage pack 203, the other end of the high-voltage pack 203 is electrically connected to one electrode of a storage battery 202, the other electrode of the storage battery 202 is electrically connected to a control circuit board 204, and the other conducting strip 201 is also electrically connected to the control circuit board 204.

The battery compartment 1014 and the installation cavity 1013 are set separately from the area for trapping mice in the upper shell 101, so as to avoid the damage of the storage battery 202, the high-voltage pack 203 and the control circuit board 204 during trapping mice. The battery compartment 1014, which is an independent space for accommodating the storage battery 202, is provided with a cover plate 1015, and the storage battery 202 can be replaced by opening the cover plate 1015, as shown in FIG. 10. The high-voltage pack 203 can increase the circuit voltage, and the control circuit board 204 is provided with an operation switch 2041, and the operation switch 2041 penetrates from the rear end face of the upper shell 101. As shown in FIG. 4, the electric shock function can be turned on or off by the operation switch 2041.

Figure 14:
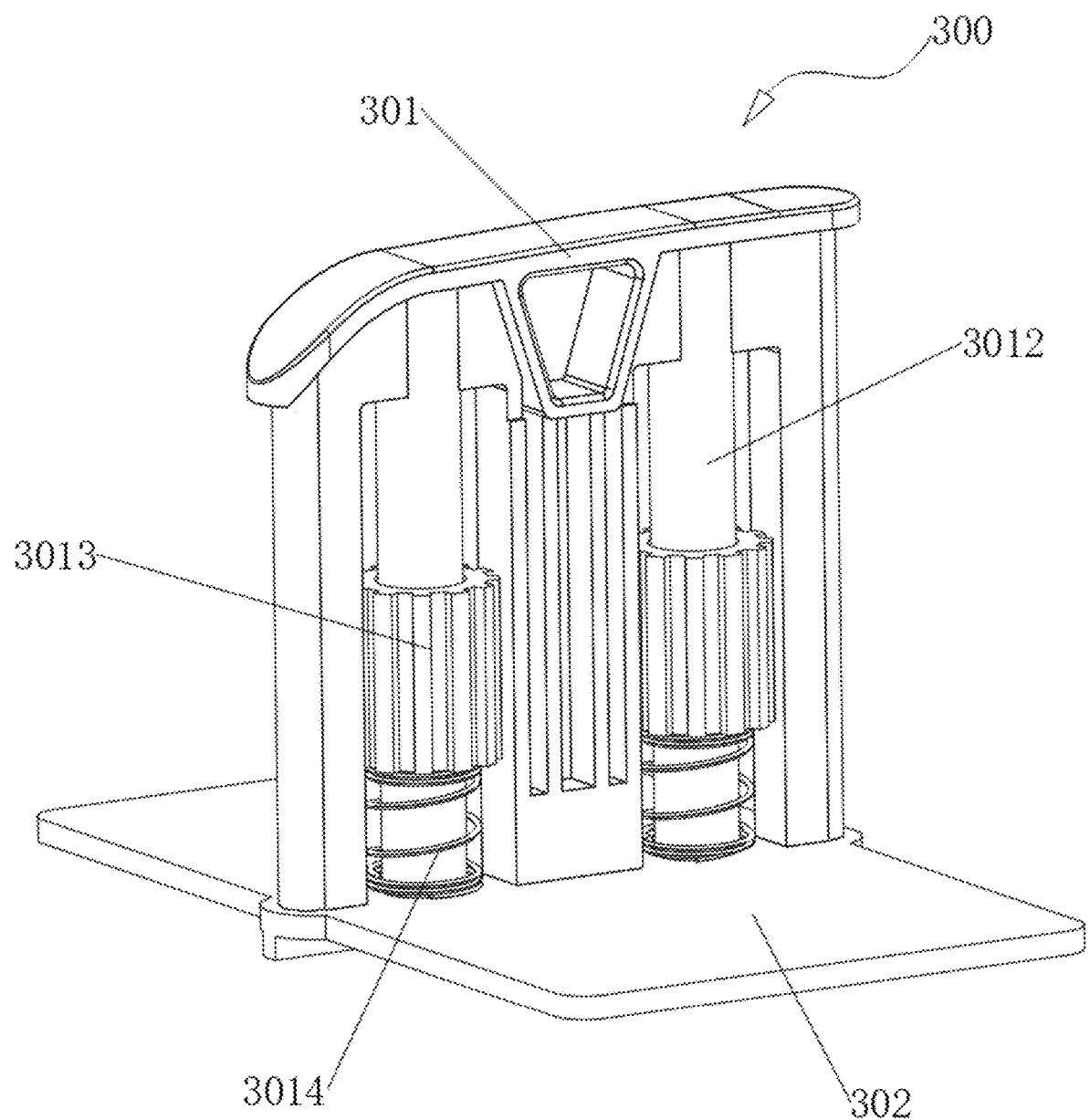
FIG. 14 is a schematic structural view of a mouse pressing device of a mouse trap according to an embodiment of the present invention.
Figure 15:
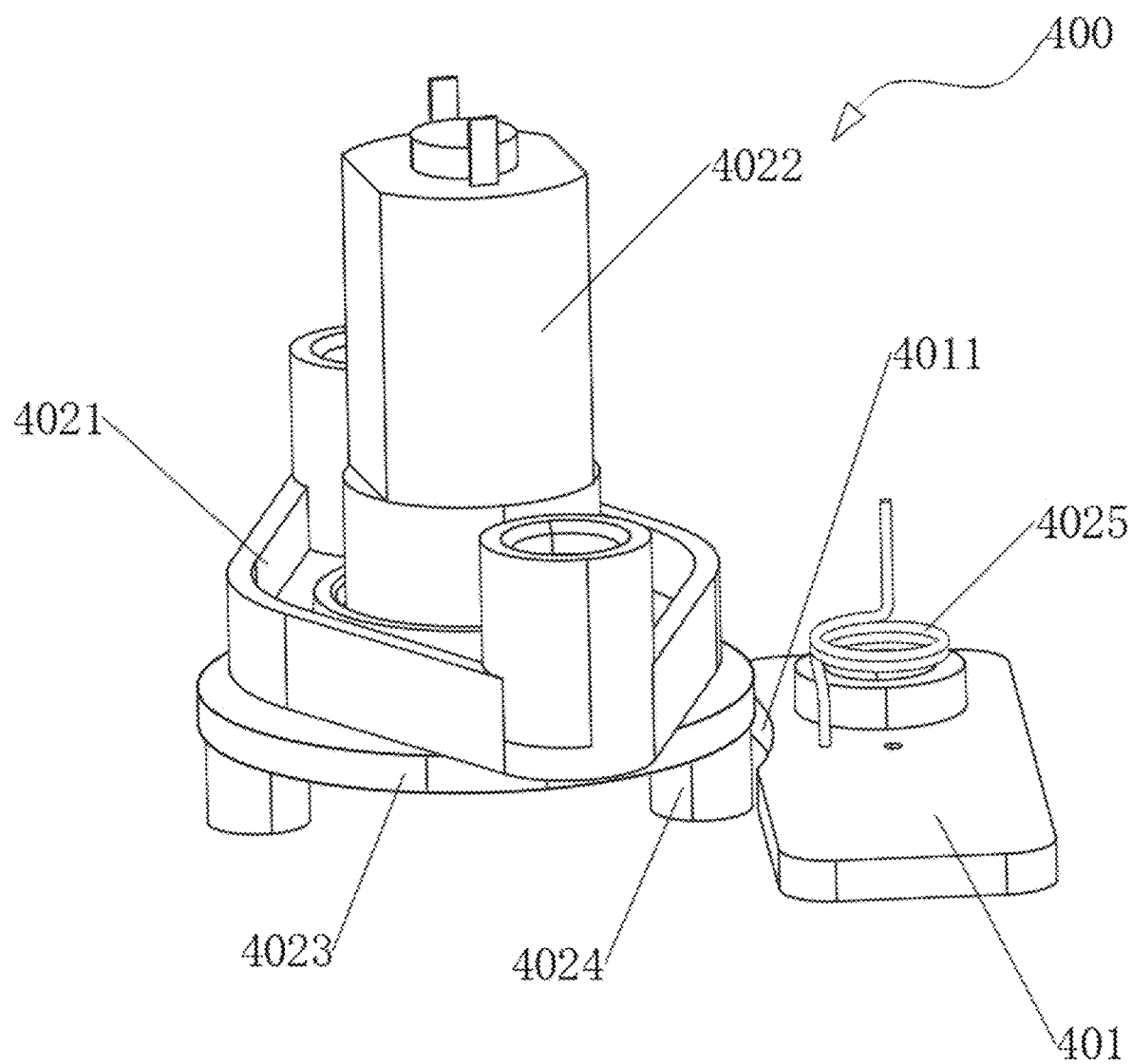
FIG. 15 is a schematic structural view of a locking device of a mouse trap according to an embodiment of the present invention.
Figure 16:
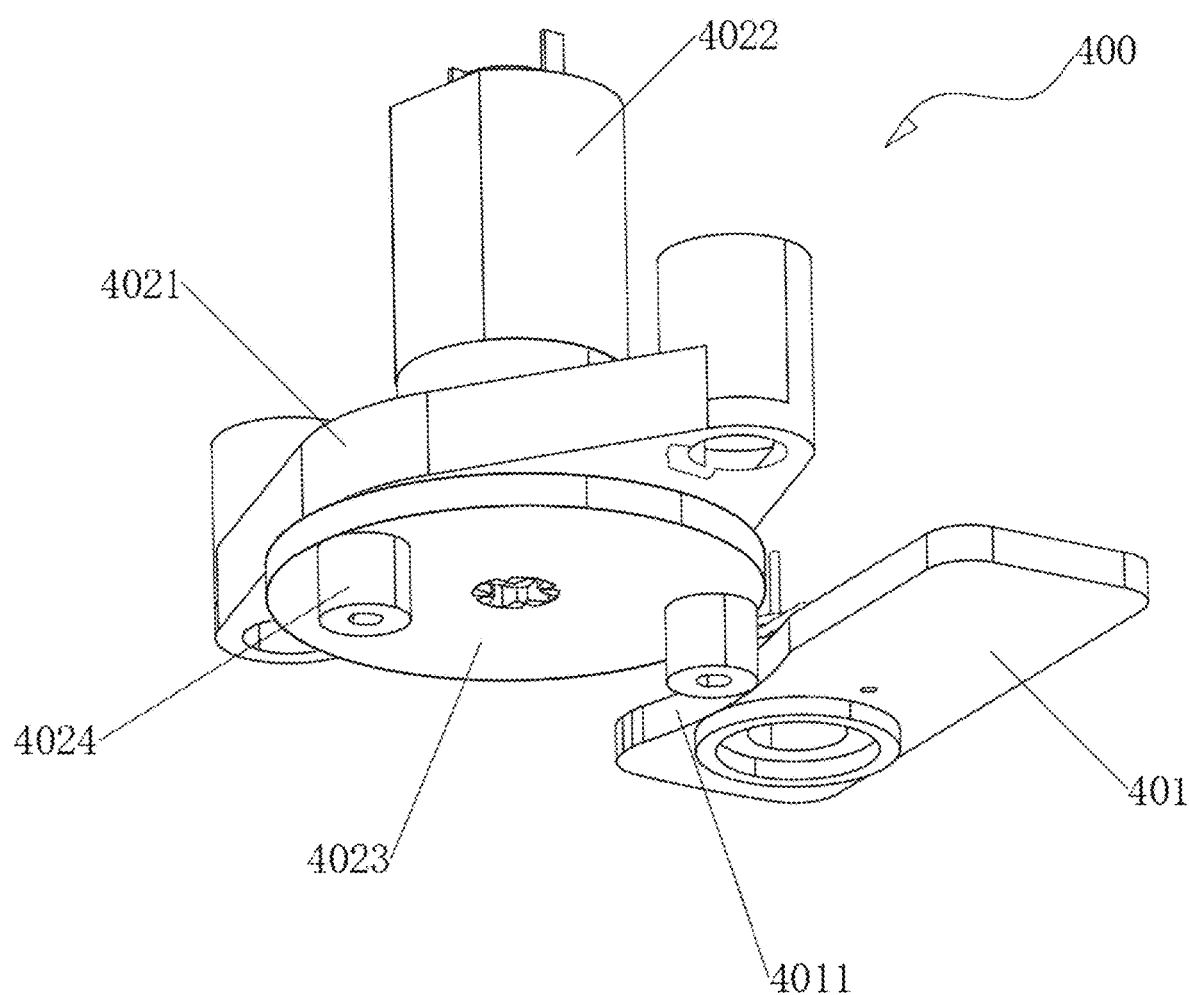
FIG. 16 is a schematic structural view of the locking device of the mouse trap according to an embodiment of the present invention from another angle.

As shown in FIGS. 5, 8 and 14, the mouse pressing device 300 includes a mouse pressing frame 301, which is movably installed on the top wall of the upper shell 101 and extends downward toward the base 102 through the top wall of the upper shell 101. The upper end of the mouse pressing frame 301 penetrates through the upper shell 101, and the lower end is located in the upper shell 101, so that the mouse pressing frame 301 is capable of moving up and down relative to the upper shell 101. The mouse pressing device 300 also includes a pressing plate 302, which is fixedly connected to the bottom of the mouse pressing frame 301 and located above the two conducting strips 201. Preferably, the bottom surface of the pressing plate 302 extends substantially in the horizontal direction. This embodiment is also provided with a guide mechanism for supporting and guiding the movement of the mouse pressing frame 301. As an embodiment, as shown in FIG. 14, the guide mechanism includes a guide post 3012 and a slide seat 3013, wherein the guide post 3012 is fixedly connected to the mouse pressing frame 301, and the slide seat 3013 is fixedly connected to the upper shell 101, and is sleeved on the periphery of the guide post 3012 and is capable of sliding in the slide seat 3013. The guide post 3012 is connected between the mouse pressing frame 301 and the pressing plate 302, the upper part of the guide post 3012 is connected with the mouse pressing frame 301, the middle part of the guide post 3012 passes through the slide seat 3013, and the bottom end of the guide post 3012 is fixedly connected with the pressing plate 302; at least two guide posts 3012 are provided. An elastic element is installed between the slide seat 3013 and the pressing plate 302. When the pressing plate 302 moves towards the slide seat 3013 with the movement of the mouse pressing frame 301, the elastic element is compressed. The elastic element is a compression spring 3014, and the compression spring 3014 is sleeved on the periphery of the guide post 3012, and both ends of the compression spring 3014 respectively abut against the slide seat 3013 and the pressing plate 302.

Because the slide seat 3013 is relatively fixed with the upper shell 101, and the slide seat 3013 is connected with the guide post 3012 in a sliding way, the mouse pressing frame 301 is capable of sliding up and down along the slide seat 3013, and then the mouse pressing frame 301 is capable of sliding up and down in the upper shell 101, thereby driving the pressing plate 302 to slide up and down synchronously.

Figure 2:
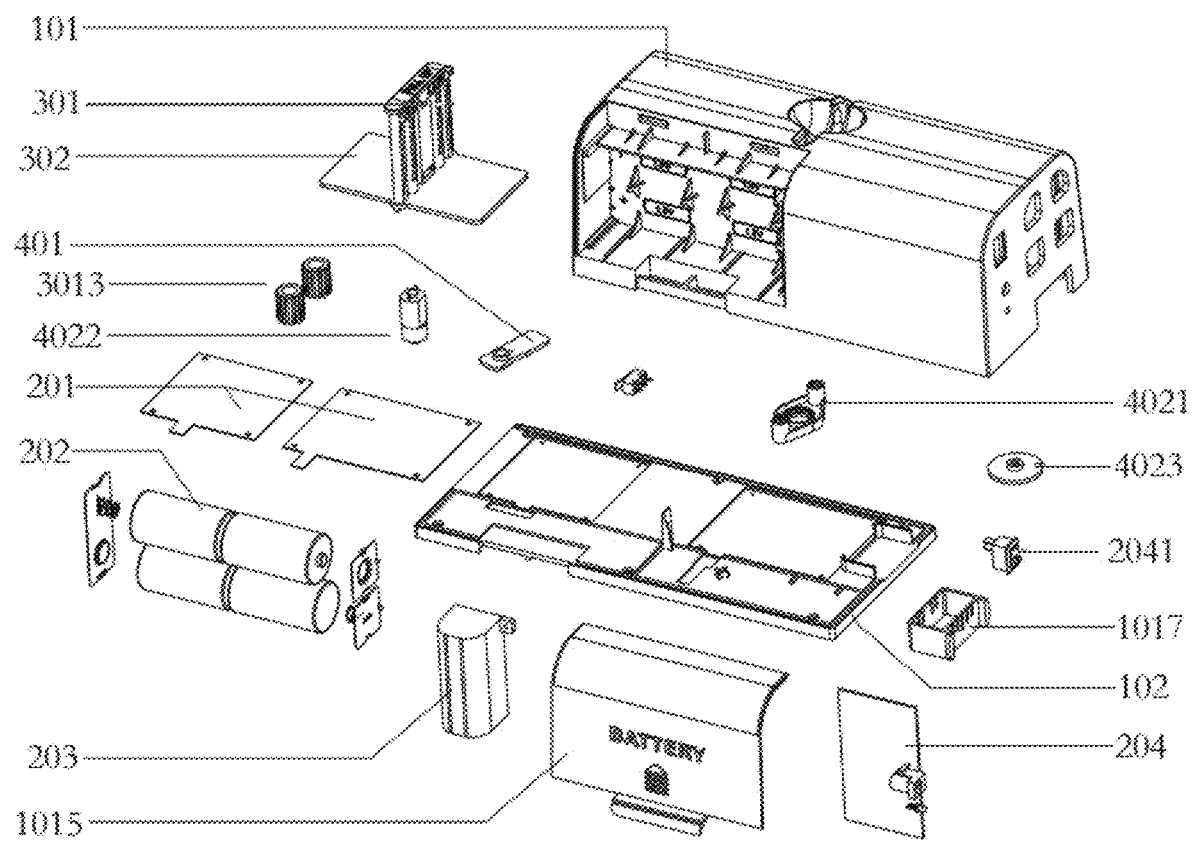
FIG. 2 is an explosion diagram according to an embodiment of the present invention.
Figure 3:
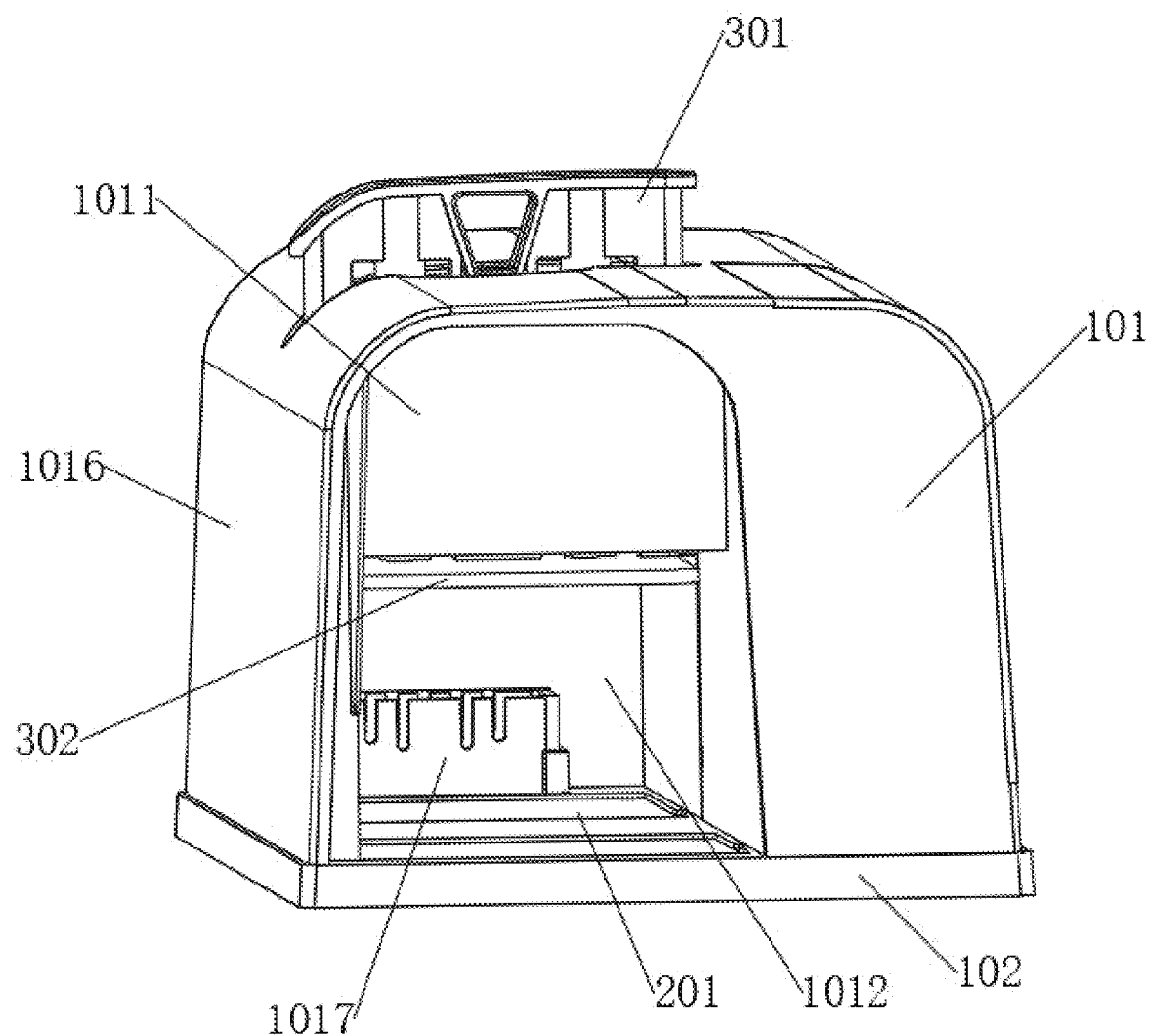
FIG. 3 is a schematic view from another perspective of the front of the luring state of the mouse trap according to an embodiment of the present invention.
Figure 6:
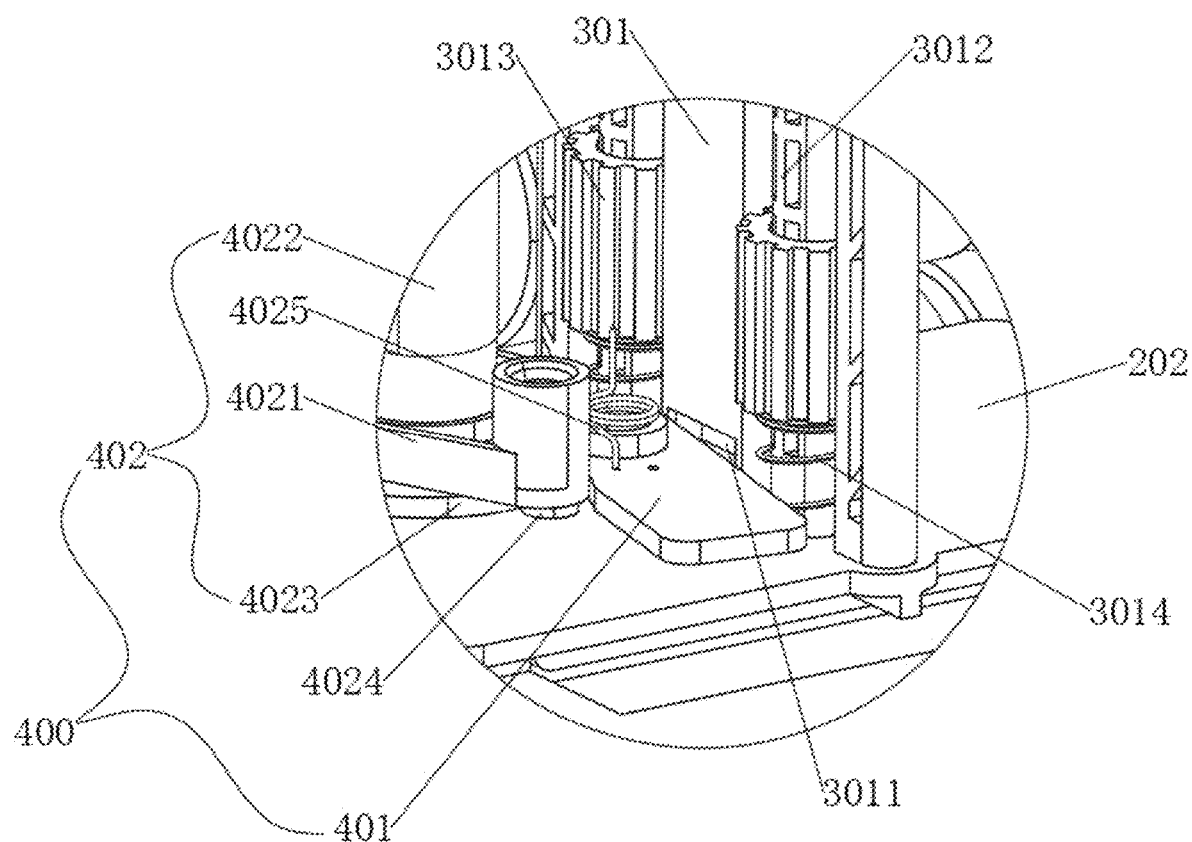
FIG. 6 is a partially enlarged schematic view at A of FIG. 5.

Preferably, as shown in FIGS. 2 and 6, the outer circumferential surface of the slide seat 3013 has a uniform convex structure, and the convex structure is embedded in the upper shell 101, so that the slide seat 3013 is firmly positioned relative to the upper shell 101.

Figure 7:
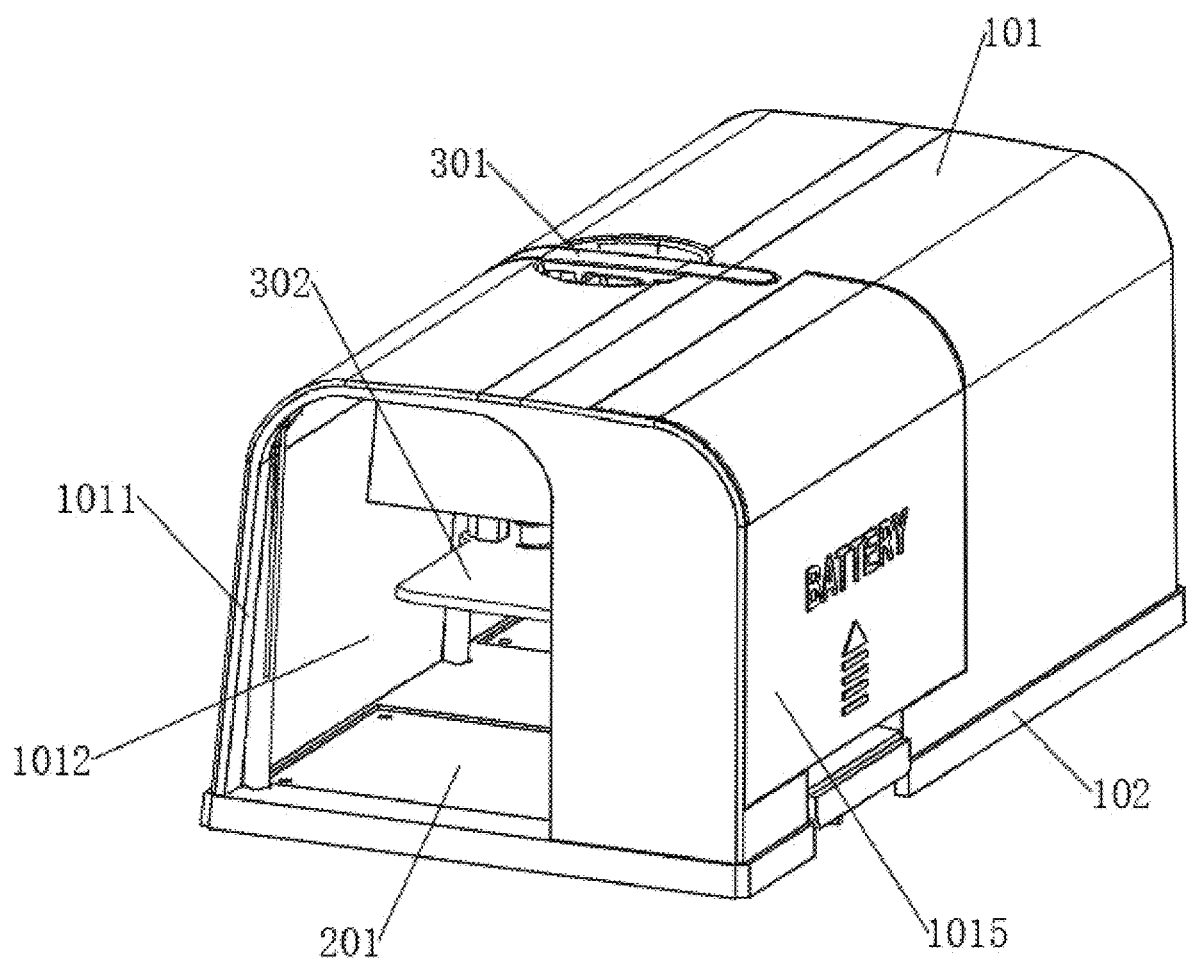
FIG. 7 is a schematic view of the front view of the killing state of the mouse trap according to an embodiment of the present invention.

The top of the upper shell 101 is provided with a concave structure, and the top of the mouse pressing frame 301 penetrates through the middle of the concave structure, as shown in FIGS. 4 and 7, so that in this way, it is convenient for users to grasp the top of the mouse pressing frame 301 with their hands and pull the mouse pressing frame 301 to move up and down. When the mouse pressing frame 301 and the pressing plate 302 are pulled up and slid, the compression spring 3014 will be compressed and generate elastic force, and when the pulling force applied to the mouse pressing frame 301 is removed, the compressed compression spring 3014 will push the mouse pressing frame 301 and the pressing plate 302 to move down quickly by using the resilience.

The locking device 400 includes a locking element 401 movably installed in the shell 100, and a driving mechanism 402 for driving the locking element 401 to move; the locking element 401 is capable of moving between a locked position and an unlocked position, and when the locking element 401 is located in the locked position, it is clamped with the mouse pressing device 300, thereby limiting the movement of the mouse pressing device 300; when the locking element 401 is in the unlocked position, the locking element 401 is released from the clamping with the mouse pressing device 300, so as to release the mouse pressing device 300 to enable it to move. The unlocked mouse pressing device will press on the mouse body, so that the struggling mouse is not easy to break away from the contact with the conductive element, and the electric shock function is prevented from stopping, so that the electric shock death rate or capture rate of the mouse can be improved in this way.

The mouse pressing frame 301 is provided with a limiting part matched with the locking element 401. When the locking element 401 moves to the locked position, the locking element 401 is clamped with the limiting part of the mouse pressing frame 301, thus locking the axial position of the mouse pressing frame 301. At this time, the mouse pressing frame 301 can no longer move up and down. When the locking element 401 moves to the unlocked position, the locking element 401 disengages from the limiting part of the mouse pressing frame 301, thereby releasing the mouse pressing frame 301 and restoring it to the state of being able to move up and down.

As an example, the locking element 401 is plate-shaped, and the limiting part of the mouse pressing frame 301 is a clamping groove 3011 arranged on one side. In the locked position, one end of the clamping plate is inserted into the clamping groove 3011, and in the unlocked position, the clamping plate is separated from the clamping groove 3011.

The locking device 400 is not limited to the above-mentioned embodiment. In other embodiments of the locking device 400 (not shown in the attached drawings), the locking device 400 can also perform locking and unlocking operations in the form of linear reciprocating motion, for example, the driving mechanism 402 drives the locking element 401 to perform linear reciprocating motion, so that the locking element is inserted into or pulled out of the clamping groove 3011, and thus the mouse pressing device 300 can also be unlocked and locked.

The locking element 401 can rotate. When the mouse pressing frame 301 is pulled to the top, the clamping groove 3011 will be aligned with the locking element 401. At this time, the locking element 401 can rotate until one end of the locking element 401 is inserted into the clamping groove 3011. At this time, if the external force applied to the mouse pressing frame 301 is removed, the mouse pressing frame 301 will be blocked by the locking element 401 caught in the clamping groove 3011, thus preventing the mouse pressing frame 301 from moving down automatically.

Preferably, the locking device 400 further includes a biasing element, preferably a torsion spring 4025. The torsion spring 4025 abuts between the upper shell 101 and the locking element 401 to provide a force for the locking element 401, so that the locking element 401 has a tendency to rotate in the first circumferential direction, that is, it biases the locking element 401 toward the locked position, so that when the mouse pressing frame 301 is pulled to align with the locking element 401, one end of the locking element 401 will be pushed by the torsion spring 4025 and automatically locked into the clamping groove 3011, so as to position the mouse pressing frame 301 in the vertical direction.

The driving mechanism 402 includes a driving motor 4022, which is in transmission connection with the locking element 401 for driving the locking element 401 to move between the locked position and the unlocked position. The driving mechanism 402 also includes a motor frame 4021 and a turntable 4023, and the motor frame 4021 is fixedly installed inside the upper shell 101. The driving motor 4022 is installed inside the motor frame 4021. The turntable 4023 is rotatably installed at the bottom of the motor frame 4021. The motor shaft of the driving motor 4022 passes through the motor frame 4021 and is fixedly connected with the top of the turntable 4023. The driving motor 4022 is electrically connected with the storage battery 202, so that the storage battery 202 provides power for it. The driving motor 4022 is also electrically connected with the control circuit board 204, so that the operation of the driving motor 4022 is controlled by the control circuit board 204. There is a coupling mechanism between the turntable 4023 and the locking element 401. The coupling mechanism includes an arc-shaped groove 4011 and at least one cylinder 4024. The arc-shaped groove 4011 is arranged on one side of the locking element 401 facing the turntable 4023, and at least one cylinder 4024 is arranged at the bottom of the turntable 4023. The cylinder 4024 of the turntable 4023 can rotate with the turntable 4023 to fit with the arc-shaped groove 4011.

In this embodiment, the driving motor 4022, the motor frame 4021 and the locking element 401 are all installed at the upper end inside the upper shell 101 and above the pressing plate 302. The cylinder 4024 is capable of sliding in the arc-shaped groove 4011, and the driving motor 4022 can drive the turntable 4023 to rotate for one circle in the first direction. When the turntable 4023 rotates, the cylinder 4024 at the bottom of the turntable 4023 rotates synchronously, so that the cylinder 4024 rotated in this way will slide through the arc-shaped groove 4011. When the cylinder 4024 rotates in the first direction and slips through the arc-shaped groove 4011, the cylinder 4024 will exert a component force on the locking element 401 to rotate in the second direction, and this component force can overcome the elastic force of the torsion spring 4025 and push the locking element 401 to rotate so as to be separated from the clamping groove 3011, so that the locking element 401 releases the restriction on the mouse pressing frame 301. After the mouse pressing frame 301 loses the restriction, the pressing plate 302 is driven to move down rapidly under the push by the elastic force of the compression spring 3014.

When the cylinder 4024 completely slides out of the arc-shaped groove 4011, the cylinder 4024 will be out of contact with the locking element 401, and then the torsion spring 4025 will push the locking element 401 to rotate in the first direction again. However, at this time, because the mouse pressing frame 301 has slipped and its clamping groove 3011 is out of alignment with the locking element 401, one end of the locking element 401 will contact with the side of the mouse pressing frame 301, and only when the mouse pressing frame 301 is pulled up again, the locking element 401 will slide on the surface of the mouse pressing frame 301 and slide into the clamping groove 3011, thus limiting the mouse pressing frame 301 in the vertical direction again.

To sum up, when using the trap, firstly, the bait for attracting mice is put into the bait slot 1017, and then the mouse pressing frame 301 is pulled by hand to rise to the uppermost position, and at the same time, the locking element 401 is rotated and inserted into the clamping groove 3011 under the elastic force of the torsion spring 4025, and then the mouse pressing frame 301 can be released, and then the operation switch 2041 on the control circuit board 204 is turned on, so that the trap will be in a luring state, as shown in FIG. 1, FIG. 2 to FIG. 5.

When the mouse is lured, the mouse will enter the shell 100 from the trap opening 1011 and move towards the bait slot 1017. During the movement of the mouse, the mouse will step between the two conducting strips 201, so that the circuit between the two conducting strips 201 will be conducted, and then the whole circuit of the electric shock device 200 will form a path, and the mouse will be shocked. When the mouse is shocked, the microcontroller on the control circuit board 204 will also be powered on and receive electrical signals, and then the microcontroller will send a signal to the driving motor 4022 to start it automatically. After the start, the driving motor 4022 will push the turntable 4023 to rotate for on circle in the first direction, and then the turntable 4023 will use the cylinder 4024 to push the locking element 401 out of the clamping groove 3011, and at the same time, the mouse pressing frame 301 will lose its limit and quickly slide down under the elastic force of the compression spring 3014. Therefore, the mouse pressing frame 301 after sliding down will press the pressing plate 302 on the mouse and press the mouse against the conducting strip 201, as shown in FIG. 6 to FIG. 7, so that the struggling mouse is not easy to get out of contact with the conducting strip 201, and the electric shock function is prevented from stopping, and the electric shock mortality rate or capture rate of the mouse can be improved.

In other embodiments (not shown in the attached drawings), the mouse pressing device 300 can also be provided with only the structure of the mouse pressing frame 301 without the pressing plate 302, so that the bottom of the mouse pressing frame 301 can directly press the mouse when pressing the mouse. With this structure, the manufacturing cost of the trap can be reduced. Moreover, the mouse pressing device 300 is not limited to the shape of the mouse pressing frame 301 in this embodiment, but in other embodiments (not shown in the attached drawings), it can also be any other three-dimensional geometric shape suitable for sliding back and forth on the upper shell 101, such as a cylinder, a plate, etc.

Figure 19:
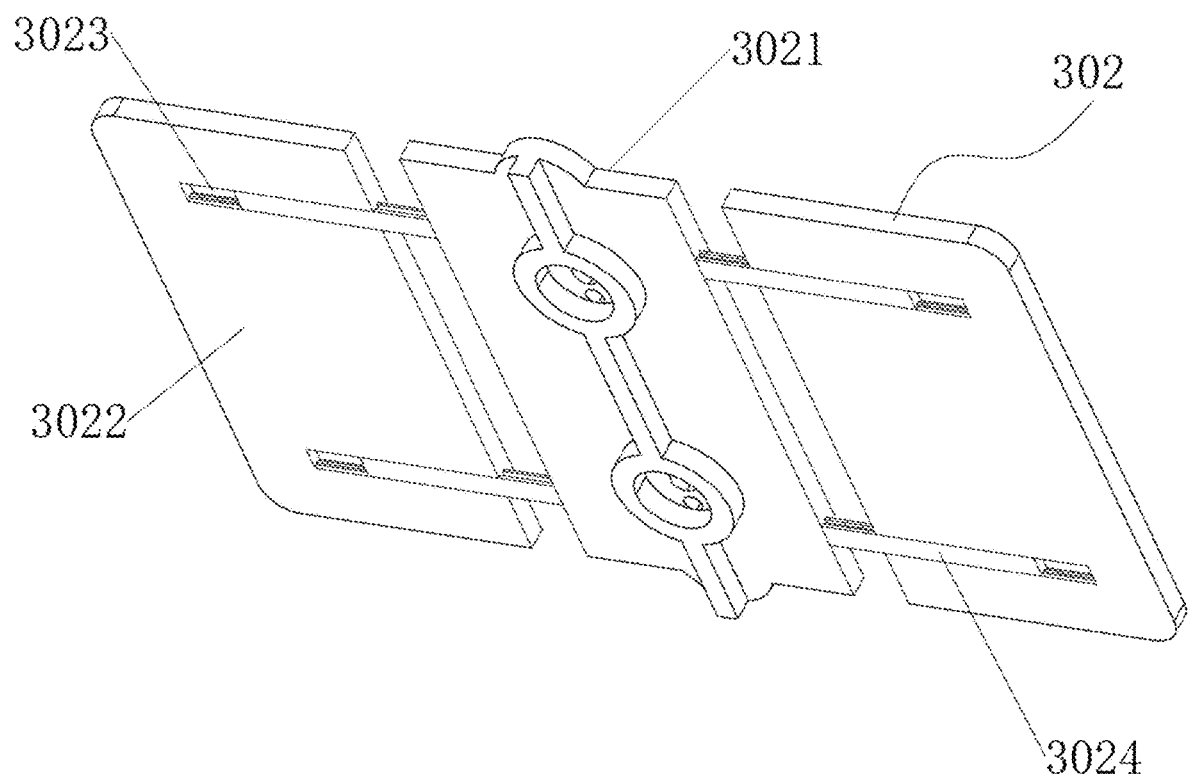
FIG. 19 is a schematic structural view of a second embodiment of the pressing plate of the mouse trap according to the present invention.

The pressing plate 302 is not limited to the structure in this embodiment. In the second embodiment of the pressing plate 302, as shown in FIG. 19, the pressing plate 302 is composed of at least one fixed plate 3021 and at least one movable plate 3022. The fixed plate 3021 is installed at the bottom of the mouse pressing frame 301, and the movable plate 3022 is located at one side of the fixed plate 3021, and at least one slide bar 3024 is installed at the side of the fixed plate 3021 facing the movable plate 3022. One side of the movable plate 3022 facing the fixed plate 3021 is provided with at least one chute 3023, and the slide bar 3024 is inserted into and connected with the chute 3023 in a sliding manner.

The movable plate 3022 and the fixed plate 3021 is capable of sliding through the cooperation between the slide bar 3024 and the chute 3023, so as to adjust the distance between the fixed plate 3021 and the movable plate 3022. In this way, the size of the pressing plate 302 can be adjusted, so that the size of the mouse can be captured as needed before the mouse is trapped, and the size of the pressing plate 302 can be adjusted to improve the capture success rate.

Figure 20:
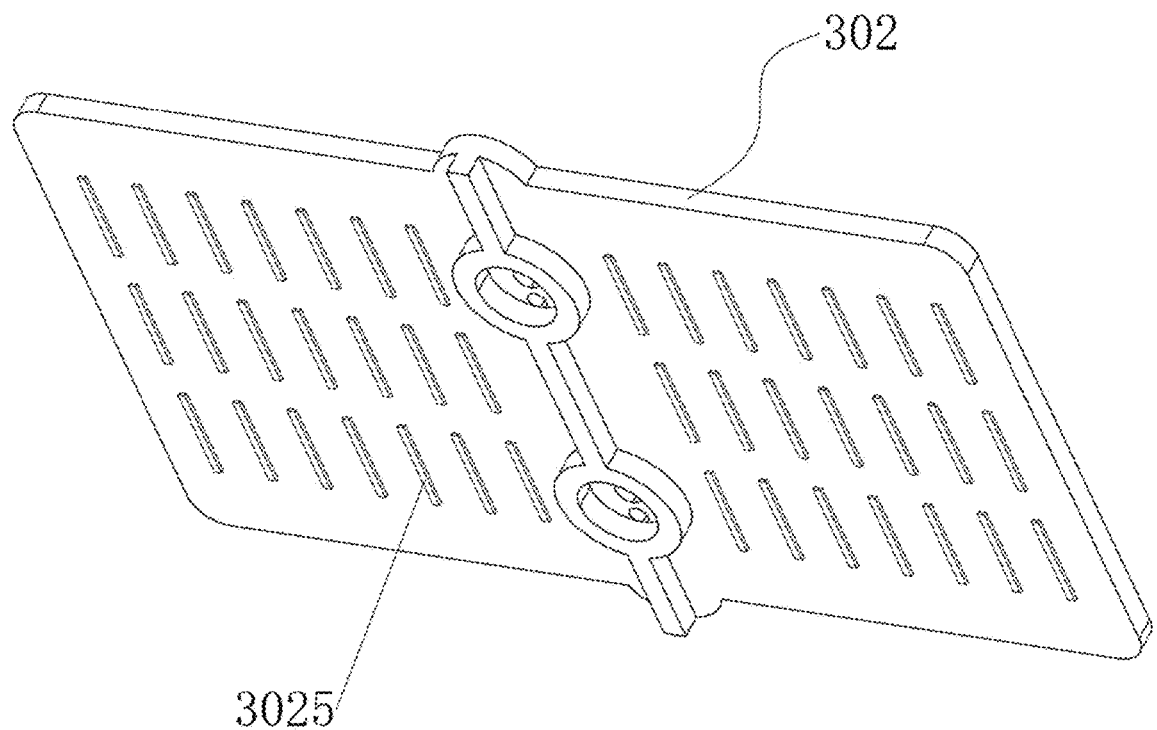
FIG. 20 is a schematic structural view of a third embodiment of the pressing plate of the mouse trap according to the present invention.

In the third embodiment of the pressing plate 302, as shown in FIG. 20, the bottom of the pressing plate 302 is provided with a plurality of anti-skid ribs 3025 protruding outward, so that after the mouse is pressed, the friction between the pressing plate 302 and the mouse is increased, and the mouse is less likely to break away from the pressing plate 302.

Figure 21:
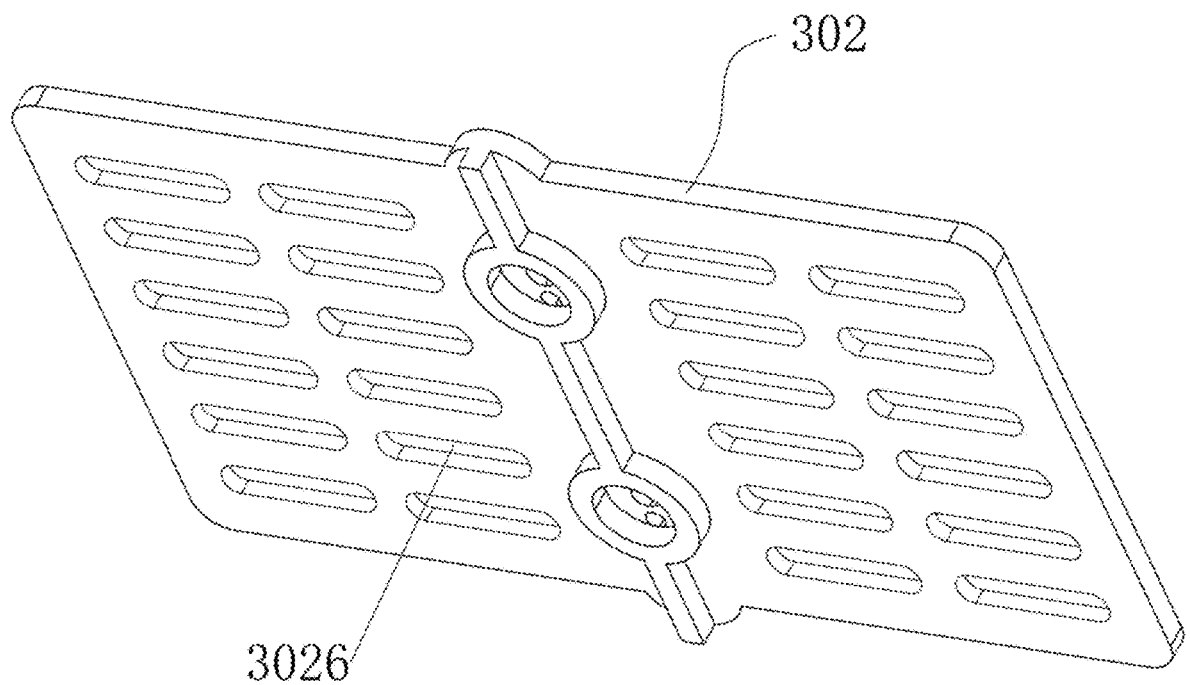
FIG. 21 is a schematic structural view of a fourth embodiment of the pressing plate of the mouse trap according to the present invention.

In the fourth embodiment of the pressing plate 302, as shown in FIG. 21, the surface of the pressing plate 302 is provided with a plurality of through grooves 3026, which can make the pressing plate 302 form a hollow structure. With the pressing plate 302 with the hollow structure, the material of the pressing plate 302 can be reduced, and at the same time, the hollow structure can also increase the friction between the pressing plate 302 and the mouse, so that the mouse is less likely to break away from the extrusion of the pressing plate 302.

The pressing plate 302 is not limited to the above-mentioned shapes or structures, and any other shapes or structures that are beneficial to catching mice can be adopted.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A mouse trap comprising a shell comprising a base and an upper shell installed above the base, wherein:
    an electric shock device, a mouse pressing device and a locking device are arranged in the shell;
    the electric shock device comprises a conductive element;
    the mouse pressing device is movably installed on a top wall of the upper shell and extends downwards towards the base, and a bottom end of the mouse pressing device is located above the conductive element of the electric shock device;
    the locking device comprises a locking element movably installed in the shell, and a driving mechanism for driving the locking element to move, wherein the locking element is capable of moving between a locked position and an unlocked position, wherein the locking element is clamped with the mouse pressing device when the locking element is located in the locked position, so as to limit a movement of the mouse pressing device; and when the locking element is in the unlocked position, the locking element is released from the mouse pressing device, so as to release the mouse pressing device to enable the mouse pressing device to move;

the driving mechanism comprises a driving motor in transmission connection with the locking element for driving the locking element to move between the locked position and the unlocked position;

the driving mechanism further comprises a motor frame and a turntable, wherein the motor frame is fixedly installed inside the upper shell; the driving motor is installed inside the motor frame, and the turntable is rotatably installed at a bottom of the motor frame; a motor shaft of the driving motor passes through the motor frame and is connected with a top of the turntable, and a coupling mechanism is arranged between the turntable and the locking element; and the coupling mechanism comprises an arc-shaped groove and at least one cylinder, wherein the arc-shaped groove is arranged on a side of the locking element facing the turntable, and the at least one cylinder is arranged at a bottom of the turntable.

2. A mouse trap comprising a shell comprising a base and an upper shell installed above the base, wherein:

an electric shock device, a mouse pressing device and a locking device are arranged in the shell;

the electric shock device comprises a conductive element;

the mouse pressing device is movably installed on a top wall of the upper shell and extends downwards towards the base, and a bottom end of the mouse pressing device is located above the conductive element of the electric shock device;

the locking device comprises a locking element movably installed in the shell, and a driving mechanism for driving the locking element to move, wherein the locking element is capable of moving between a locked position and an unlocked position, wherein the locking element is clamped with the mouse pressing device when the locking element is located in the locked position, so as to limit a movement of the mouse pressing device; and when the locking element is in the unlocked position, the locking element is released from the mouse pressing device, so as to release the mouse pressing device to enable the mouse pressing device to move;

the mouse pressing device further comprises a mouse pressing frame, an upper end of the mouse pressing frame penetrates through the upper shell and a lower end of the mouse pressing frame is located in the upper shell; the mouse pressing frame is capable of moving up and down relative to the upper shell, and a guide mechanism is arranged between the mouse pressing frame and the upper shell;

the mouse pressing device further comprises a pressing plate installed at a bottom of the mouse pressing frame and above the conductive element, and a bottom surface of the pressing plate extending basically in a horizontal direction;

the guide mechanism comprises a guide post and a slide seat, wherein the guide post is fixedly connected to the mouse pressing frame, and the slide seat is fixedly connected with the upper shell; the slide seat is sleeved on a periphery of the guide post and the guide post is capable of sliding in the slide seat; and an elastic element is installed between the slide seat and the pressing plate, and the elastic element is compressed when the pressing plate moves towards the slide seat along with a movement of the mouse pressing frame.

3. The mouse trap according to claim 2, wherein the elastic element is a compression spring sleeved on the periphery of the guide post, and both ends of the compression spring are respectively abutted against the slide seat and the pressing plate.

4. A mouse trap comprising a shell comprising a base and an upper shell installed above the base, wherein:

an electric shock device, a mouse pressing device and a locking device are arranged in the shell;

the electric shock device comprises a conductive element;

the mouse pressing device is movably installed on a top wall of the upper shell and extends downwards towards the base, and a bottom end of the mouse pressing device is located above the conductive element of the electric shock device;

the locking device comprises a locking element movably installed in the shell, and a driving mechanism for driving the locking element to move, wherein the locking element is capable of moving between a locked position and an unlocked position, wherein the locking element is clamped with the mouse pressing device when the locking element is located in the locked position, so as to limit a movement of the mouse pressing device; and when the locking element is in the unlocked position, the locking element is released from the mouse pressing device, so as to release the mouse pressing device to enable the mouse pressing device to move;

the mouse pressing device comprises a mouse pressing frame, an upper end of the mouse pressing frame penetrates through the upper shell and a lower end of the mouse pressing frame is located in the upper shell; the mouse pressing frame is capable of moving up and down relative to the upper shell, and a guide mechanism is arranged between the mouse pressing frame and the upper shell;

the mouse pressing device further comprises a pressing plate installed at a bottom of the mouse pressing frame and above the conductive element, a bottom surface of the pressing plate extending basically in a horizontal direction;

the guide mechanism comprises at least two guide posts and a slide seat, wherein each of the at least two guide posts is fixedly connected to the mouse pressing frame, and the slide seat is fixedly connected with the upper shell; the slide seat is sleeved on a periphery of each of the at least two guide posts and the at least two guide posts are capable of sliding in the slide seat; and the at least two guide posts are connected between the mouse pressing frame and the pressing plate; an upper part of each of the at least two guide posts is connected with the mouse pressing frame, a middle part of each of the at least two guide posts passes through the slide seat, and a bottom end of each of the at least two guide posts is fixedly connected with the pressing plate.

5. The mouse trap according to claim 4, wherein the mouse pressing device is further provided with a limiting part matched with the locking element, and when the locking element moves to the locked position, the locking element is clamped with the limiting part of the mouse pressing device to lock the mouse pressing device; and when the locking element moves to the unlocked position, the locking element is separated from the limiting part of the mouse pressing device to release the mouse pressing device.

6. The mouse trap according to claim 5, wherein the locking element is a clamping plate, and the limiting part of the mouse pressing device is a clamping groove opened at one side; in the locked position, one end of the clamping plate is inserted into the clamping groove, and in the unlocked position, the clamping plate is separated from the clamping groove.

7. The mouse trap according to claim 4, wherein the electric shock device further comprises a storage battery, a high-voltage pack and a control circuit board, wherein a battery compartment is arranged in the upper shell, and the storage battery is installed in the battery compartment, and a detachable cover plate is arranged on the upper shell corresponding to the battery compartment.

8. The mouse trap according to claim 7, wherein an installation cavity is further arranged in the upper shell, the installation cavity is separated from the battery compartment, and both the high-voltage pack and the control circuit board are both installed in the installation cavity.

9. The mouse trap according to claim 8, wherein the upper shell further comprises a trap area, and the installation cavity and/or the battery compartment are isolated from the trap area.

10. The mouse trap according to claim 4, wherein the pressing plate is composed of at least one fixed plate and at least one movable plate; the at least one fixed plate is installed at the bottom of the mouse pressing frame, and the at least one movable plate is located at one side of the at least one fixed plate.

11. The mouse trap according to claim 10, wherein at least one slide bar is installed on a side of the at least one fixed plate facing the at least one movable plate, and at least one chute is opened on a side of the at least one movable plate facing the at least one fixed plate, and the at least one slide bar is inserted into and connected with the at least one chute in a sliding way.

12. The mouse trap according to claim 4, wherein the bottom of the pressing plate is provided with a plurality of anti-skid ribs protruding outwards or a surface of the pressing plate is provided with a plurality of through grooves.

13. The mouse trap according to claim 4, wherein the driving mechanism comprises a driving motor, and the driving motor is in transmission connection with the locking element for driving the locking element to move between the locked position and the unlocked position.

14. The mouse trap according to claim 13, wherein the driving mechanism further comprises a motor frame and a turntable, wherein the motor frame is fixedly installed inside the upper shell; the driving motor is installed inside the motor frame, and the turntable is rotatably installed at a bottom of the motor frame; a motor shaft of the driving motor passes through the motor frame and is connected with a top of the turntable, and a coupling mechanism is arranged between the turntable and the locking element.

15. The mouse trap according to claim 4, wherein the locking device further comprises a biasing element abutting between the upper shell and the locking element to provide a force for the locking element to bias the locking element toward the locked position.

\* \* \* \* \*